US012666473B2

(12) United States Patent
Fu et al.

(10) Patent No.: US 12,666,473 B2
(45) Date of Patent: Jun. 23, 2026

(54) PATH SECTION BETWEEN Uu AND PC5

(71) Applicant: Telefonaktiebolaget LM Ericsson (publ), Stockholm (SE)

(72) Inventors: Zhang Fu, Stockholm (SE); Conny Larsson, Åkersberga (SE); Anders E. Eriksson, Kista (SE); Shabnam Sultana, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 249 days.

(21) Appl. No.: 17/796,763

(22) PCT Filed: Feb. 2, 2021

(86) PCT No.: PCT/EP2021/052433
§ 371 (c)(1),
(2) Date: Aug. 1, 2022

(87) PCT Pub. No.: WO2021/156254
PCT Pub. Date: Aug. 12, 2021

(65) Prior Publication Data
US 2023/0071815 A1     Mar. 9, 2023

Related U.S. Application Data

(60) Provisional application No. 62/969,350, filed on Feb. 3, 2020.

(51) Int. Cl.
H04W 76/14      (2018.01)
H04W 40/02      (2009.01)
*H04W 4/46*      (2018.01)
(52) U.S. Cl.
CPC .......... H04W 76/14 (2018.02); H04W 40/02 (2013.01); *H04W 4/46* (2018.02)

(58) Field of Classification Search
CPC ....... H04W 76/14; H04W 40/02; H04W 4/46; H04W 4/40; H04W 8/22; H04W 92/10; H04W 92/18
See application file for complete search history.

(56) References Cited

U.S. PATENT DOCUMENTS 12,256,296 B2 *   3/2025   Ali .......................... H04W 80/04
2017/0111754 A1 *  4/2017   Baghel .................. H04W 76/27
(Continued)

FOREIGN PATENT DOCUMENTS

EP        3518498 A1 *  7/2019   ........... H04W 48/12
KR        20160134392 A   11/2016
(Continued)

OTHER PUBLICATIONS

Korean Office Action with English language summary translation dated Jan. 29, 2024 for Patent Application No. 10-2022-7030154, consisting of 15 pages.
(Continued)

*Primary Examiner* — Shah M Rahman
(74) *Attorney, Agent, or Firm* — Weisberg, I.P. Law, P.A.

(57)      ABSTRACT

Apparatuses and methods for path selection. In one embodiment, a method implemented in a first user equipment (UE) includes sending a message over PC5, the message including a Uu-status parameter, the Uu-status parameter indicating a request for Uu status information. In one embodiment, a method implemented in a first user equipment (UE) includes receiving a message over PC5, the message including a Uu-status parameter, the Uu-status parameter indicating a request for Uu status information.

22 Claims, 7 Drawing Sheets

(56) References Cited

U.S. PATENT DOCUMENTS

| | | | | |
|---|---|---|---|---|
| 2017/0353819 A1* | 12/2017 | Yin | ............ | H04L 47/30 |
| 2018/0213577 A1* | 7/2018 | Burbidge | .............. | H04W 76/10 |
| 2018/0295497 A1* | 10/2018 | Kim | ......... | H04W 8/08 |
| 2019/0090173 A1* | 3/2019 | Xiao | ......... | H04W 4/40 |
| 2019/0098542 A1* | 3/2019 | Tang | ......... | H04W 36/305 |
| 2019/0394816 A1* | 12/2019 | Kim | ......... | H04W 76/10 |
| 2020/0100088 A1* | 3/2020 | Kim | ......... | H04W 48/16 |
| 2020/0221298 A1* | 7/2020 | Pan | ......... | H04W 12/50 |
| 2022/0124466 A1* | 4/2022 | Ali | ......... | H04W 4/40 |
| 2022/0124549 A1* | 4/2022 | Yang | ......... | H04W 28/0268 |
| 2022/0191733 A1* | 6/2022 | Ali | ......... | H04W 24/08 |
| 2022/0295330 A1* | 9/2022 | Ji | ......... | H04W 40/02 |
| 2022/0295375 A1* | 9/2022 | Wang | ......... | H04W 76/14 |
| 2022/0345879 A1* | 10/2022 | Park | ......... | H04W 80/10 |
| 2022/0353799 A1* | 11/2022 | Talebi Fard | ......... | H04W 48/16 |
| 2023/0007709 A1* | 1/2023 | Paladugu | .............. | H04W 12/03 |
| 2023/0283998 A1* | 9/2023 | Perras | ......... | H04L 69/324 |
| | | | | 455/411 |

FOREIGN PATENT DOCUMENTS

| | | | | |
|---|---|---|---|---|
| KR | 20180034524 A | 4/2018 | | |
| KR | 20180042316 A | 4/2018 | | |
| KR | 20190002431 A | 1/2019 | | |
| WO | WO-2017133644 A1 * | 8/2017 | ............ | H04W 40/02 |
| WO | 2018031343 A1 | 2/2018 | | |
| WO | 2020/198713 A1 | 10/2020 | | |

OTHER PUBLICATIONS

International Search Report and Written Opinion dated May 6, 2021 for International Application No. PCT/EP2021/052433 filed Feb. 2, 2021; consisting of 15 pages.

3GPP TS 23.287 V16.0.0; 3rd Generation Partnership Project; Technical Specification Group Services and System Aspects; Architecture enhancements for 5G System (5GS) to support Vehicle-to-Everything (V2X) services (Release 16): Sep. 2019; consisting of 49 pages.

3GPP TS 23.303 V15.1.0; 3rd Generation Partnership Project; Technical Specification Group Services and System Aspects; Proximity-based services (ProSe); Stage 2 (Release 15); Jun. 2018; consisting of 130 pages.

3GPP TSG-RAN WG2 Meeting#105bis R2-1904500; Title: On the need for PC5-RRC Connection establishment; Agenda Item: 11.4.4; Source: Intel Corporation; Document for: Discussion; Date and Location: Apr. 8-12, 2019, Xi'an, China; consisting of 7 pages.

3GPP TSG-RAN WG2 #108 R2-1916126; Title: PC5-RRC and Uu RRC procedures; Agenda Item: 6.4.5; Source: LG Electronics Inc.; Document for: Discussion and Decision; Date and Location: Nov. 18-22, 2019, Reno, USA; consisting of 5 pages.

Korean Office Action dated Nov. 28, 2024 and English language translation of the Korean Office Action issued in Application No. 10-2022-7030154, consisting of 10 pages.

3GPP TSG-SA2 Meeting #135 S2-1909038; Change Request 23.287 CR 0016 Current Version 16.0.0; Title: PC5: IP or Unstructured data; Source to WG: VIVO Mobile Communication Co. Ltd.; Source to TSG: 3GPP SA WG2; Work Item Code: eV2XARC; Category: F; Split, Croatia, Oct. 14-18, 2019, consisting of 8 pages.

Korean Notice of Allowance and machine English translation of the Korean Notice of Allowance dated Apr. 3, 2026 issued in corresponding Korean Application No. 10-2022-7030154, consisting of 10 pages.

3GPP TSG-RAN WG2 Meeting#105bis R2-1904500; Source: Intel Corporation; Title: On the need for PC5-RRC Connection establishment; Agenda Item: 11.4.4; Document for: Discussion; Xi'an, China, Apr. 8-12, 2019, consisting of 7 pages.

3GPP TSG-RAN WG2 #108 R2-1916126; Source : LG Electronics Inc.; Title : PC5-RRC and UU RRC procedures; Agenda Item: 6.4.5; Document for : Discussion and Decision; Reno, USA, Nov. 18-22, 2019, consisting of 5 pages.

* cited by examiner

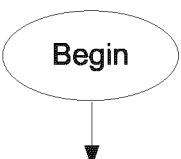

Begin

Send a direct communication request message to initiate a layer-2 link establishment procedure over PC5, the direct communication request message including a Uu-status parameter, the Uu-status parameter indicating a request for Uu status information
S126

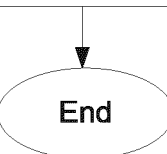

End

FIG. 6

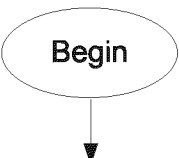

Begin

Receive a direct communication request message to initiate a layer-2 link establishment procedure over PC5, the direct communication request message including a Uu-status parameter, the Uu-status parameter indicating a request for Uu status information
S128

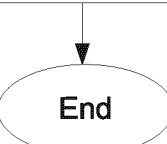

End

FIG. 7

PATH SECTION BETWEEN Uu AND PC5

CROSS-REFERENCE TO RELATED APPLICATIONS

This application is a Submission Under 35 U.S.C. § 371 for U.S. National Stage Patent Application of International Application No.: PCT/EP2021/052433, filed Feb. 2, 2021 entitled "PATH SECTION BETWEEN UU AND PC5," which claims priority to U. S. Provisional Application No.: 62/969,350, filed Feb. 3, 2020, entitled "PATH SELECTION BETWEEN UU AND PC5," the entireties of both of which are incorporated herein by reference.

TECHNICAL FIELD

The present disclosure relates to wireless communication and in particular, methods and apparatuses for path selection between Uu and PC5.

INTRODUCTION

Uu and PC5 Interface

FIG. 1 is an example of a system shown in Third Generation Partnership Project (3GPP) Technical Specification (TS) 23.287 (incorporated herein by reference). FIG. 1 shows a high level view of an example non-roaming 3GPP Fifth Generation (5G, also called New Radio or NR) system 10 architecture for vehicle-to-everything (V2X) communication over PC5 and Uu reference points/interfaces. Two user equipments (UEs) can communicate with each other either directly via the PC5 sidelink or the two UEs can communicate through the Uu interface and via the application server (AS).

Referring to FIG. 1, system 10 includes a 5C core (5GC) including a unified data management (UDM) node 12, a policy control function (PCF) node 14, a Network Exposure Function (NEF) node 16, an access function (AF) node 18, a unified data repository (UDR) node 20, an Access and Mobility Function (AMF) node 22, a session management function (SMF) node 24 and a user plane function (UPF) node 26.

The system 10 may further include a next generation-radio access network (NG-RAN) 28 and multiple user equipments (UEs), UEA 30a, UEB 30b, UEC 30c and UED 30d (collectively, UE 30). The RAN 28 may provide radio access to the UE 30 via a Uu interface and may connect to the 5GC. Although an NG-RAN is shown in this example, some embodiments of a system may include another type of RAN such as a Long Term Evolution (LTE) RAN. The system 10 may include a data network 32 including a V2X application server (AS) 34. There may be a V2X application 36a-d (collectively, V2X application 36) in each of the UEs 30 that may communicate with the V2X application server 34 to support V2X services. It should be understood that the system 10 may include numerous devices/nodes of those shown in FIG. 1, as well as, additional devices/nodes not shown in FIG. 1. In addition, the system 10 may include many more connections/interfaces than those shown in FIG. 1.

Unicast PC5 Link Setup Defined in TS 23.287

To perform unicast mode over a PC5 reference point, the UE 30 may be configured with the related information as described in, for example, clause 5.1.2.1 in TS 23.287.

FIG. 2 is a flow diagram that shows an example of a layer-2 link establishment procedure for unicast mode of V2X communication over the PC5 reference point. In the procedure description below, all section references refer to 3GPP TS 23.287 unless otherwise stated. The steps shown in FIG. 2 may be described as follows:

1. In steps S100-S106, the UE(s) 30b, 30c, 30d may determine the destination Layer-2 identity/identifier (ID) for signalling reception for PC5 unicast link establishment as specified in, for example, clause 5.6.1.4. The destination Layer-2 ID is configured with the UE(s) 30b, 30c, 30d as specified in clause 5.1.2.1, for example.

2. In step S108, the V2X application layer in UE-1 30a may provide application information for PC5 unicast communication. The application information includes the service type(s) (e.g., provider service identifiers (PSID(s)) or Intelligent Transport Systems (ITS) Application Identifiers (ITS-AID(s)) of the V2X application and the initiating UE's 30a Application Layer ID. The target UE's 30 Application Layer ID may be included in the application information.

The V2X application layer in UE-1 30a may provide V2X Application Requirements for this unicast communication. UE-1 30a determines the PC5 Quality of Service (QoS) parameters and PC5 QOS Flow Identifier (PFI) as specified in clause 5.4.1.4, for example.

If UE-1 30a decides to reuse the existing PC5 unicast link as specified in clause 5.2.1.4, the UE 30a triggers Layer-2 link modification procedure as specified in clause 6.3.3.4, for example.

3. In step S110, the UE-1 30a sends a Direct Communication Request message to initiate the unicast layer-2 link establishment procedure. The Direct Communication Request message may include:

I. Source User Information: the initiating UE's Application Layer ID (i.e., UE-1's 30a Application Layer ID).

II. If the V2X application layer provided the target UE's Application Layer ID in step 2, the following information may be included:

Target User Information: the target UE's Application Layer ID (i.e., UE-2's 30b Application Layer ID).

III. V2X Service Info: the information about V2X Service(s) requesting Layer-2 link establishment (e.g. provider service identifiers (PSID(s)) or Intelligent Transport Systems (ITS) Application Identifiers (ITS-AID(s)).

IV. Indication whether Internet Protocol (IP) communication is used.

V. IP Address Configuration: For IP communication, IP address configuration is required for this link and indicates one of the following values:

"IPv6 Router" if IP version 6 (IPv6) address allocation mechanism is supported by the initiating UE, i.e., acting as an IPv6 Router; or "IPv6 address allocation not supported" if IPv6 address allocation mechanism is not supported by the initiating UE.

VI. Link Local IPv6 Address: a link-local IPv6 address formed locally based on the Internet Engineering Task Force (IETF) Request for Comment (RFC) 4862 if UE-1 does not support the IPv6 IP address allocation mechanism, i.e., the IP Address Configuration indicates "IPv6 address allocation not supported".

VII. QoS Information: the information about PC5 QoS Flow(s). For each PC5 QoS Flow, the PFI and the corresponding PC5 QoS parameters (i.e., PC5 5QI (PQI) and conditionally other parameters such as maximum flow bit rate/guaranteed flow bit rate (MFBR/GFBR), etc).

The source Layer-2 ID and destination Layer-2 ID used to send the Direct Communication Request message are determined as specified in clauses 5.6.1.1 and 5.6.1.4, for example.

UE-1 30*a* sends the Direct Communication Request message via PC5 broadcast using the source Layer-2 ID and the destination Layer-2 ID.

4. A Direct Communication Accept message is sent to UE-1 30*a* as below:

4*a*. (UE oriented Layer-2 link establishment) In step S112, if the Target User Information (Info) is included in the Direct Communication Request message, the target UE, i.e., UE-2 30*b* responds with a Direct Communication Accept message.

4*b*. (V2X Service oriented Layer-2 link establishment) In step S1114, if the Target User Info is not included in the Direct Communication Request message, the UEs 30 that are interested in using the announced V2X Service(s), may decide to establish Layer-2 link with UE-1 30*a* and respond to the request by sending a Direct Communication Accept message (UE-2 30*b* and UE-4 30*d* in FIG. 2).

The Direct Communication Accept message may include:

a) Source User Info: Application Layer ID of the UE sending the Direct Communication Accept message.

b) QoS Info: the information about PC5 QoS Flow(s). For each PC5 QoS Flow, the PFI and the corresponding PC5 QoS parameters requested by UE-1 30*a* (i.e., PQI and conditionally other parameters such as MFBR/GFBR, etc).

c) IP Address Configuration: For IP communication, IP address configuration is required for this link and indicates one of the following values:

i. "IPv6 Router" if IPv6 address allocation mechanism is supported by the target UE, i.e., acting as an IPv6 Router; or ii. "IPv6 address allocation not supported" if IPv6 address allocation mechanism is not supported by the target UE.

d) Link Local IPv6 Address: a link-local IPv6 address formed locally based on IETF RFC 4862 if the target UE does not support the IPv6 IP address allocation mechanism, i.e., the IP Address Configuration indicates "IPv6 address allocation not supported", and UE-1 included a link-local IPv6 address in the Direct Communication Request message. The target UE may include a non-conflicting link-local IPv6 address.

If both UEs (i.e., the initiating UE and the target UE) selected to use link-local IPv6 address, they may disable the duplicate address detection defined in IETF RFC 4862, for example.

The source Layer-2 ID used to send the Direct Communication Accept message may be determined as specified in clauses 5.6.1.1 and 5.6.1.4, for example. The destination Layer-2 ID is set to the source Layer-2 ID of the received Direct Communication Request message.

Upon receiving the Direct Communication Accept message from peer UE, UE-1 30*a* obtains the peer UE's Layer-2 ID for future communication, for signalling and data traffic for this unicast link.

The V2X layer of the UE that established PC5 unicast link passes the PC5 Link Identifier assigned for the unicast link and PC5 unicast link related information down to the AS layer. The PC5 unicast link related information includes Layer-2 ID information (i.e., source Layer-2 ID and destination Layer-2 ID). This enables the AS layer to maintain the PC5 Link Identifier together with the PC5 unicast link related information.

5. In steps S116-S120, V2X service data is transmitted over the established unicast link as below:

The PC5 Link Identifier and PFI are provided to the AS layer, together with the V2X service data.

UE-1 30*a* sends the V2X service data using the source Layer-2 ID (i.e., UE-1's Layer-2 ID for this unicast link) and the destination Layer-2 ID (i.e., the peer UE's Layer-2 ID for this unicast link).

PC5 unicast link is bi-directional, therefore the peer UE (e.g., UE-2 30*b* and UE-4 30*d*) of UE-1 30*a* can send the V2X service data to UE-1 30*a* over the unicast link with UE-1 30*a*.

SUMMARY

Some embodiments advantageously provide methods and apparatuses for path selection between Uu and PC5.

In one aspect of the present disclosure, a method implemented in a first user equipment (UE) includes sending a direct communication request message to initiate a layer-2 link establishment procedure, the direct communication request message including a Uu-status parameter, the Uu-status parameter indicating a request for Uu status information.

In another aspect of the present disclosure, a method implemented in a first user equipment (UE) includes receiving a direct communication request message to initiate a layer-2 link establishment procedure, the direct communication request message including a Uu-status parameter, the Uu-status parameter indicating a request for Uu status information.

According to an aspect of the present disclosure, a method implemented in a first user equipment, UE, is provided. The method includes sending a message over PC5, the message including a Uu-status parameter, the Uu-status parameter indicating a request for Uu status information.

In some embodiments of this aspect, the message is a direct communication request message; and sending the message comprises sending the direct communication request message comprising the Uu-status parameter to initiate a layer-2 link establishment procedure. In some embodiments of this aspect, the Uu-status parameter indicates a request for one or more of: whether a second UE has an established a protocol data unit, PDU, session with a radio access network, RAN; whether the second UE is able to communicate with a proximity-based service, ProSe, application server; communication latency information through the second UE's Uu interface; a path selection policy associated with the second UE; Uu path availability information from the second UE; and the second UE's communication capabilities associated with the Uu interface.

In some embodiments of this aspect, the ProSe application server is a vehicle-to-everything, V2X, application server. In some embodiments of this aspect, the message further includes in indication of a path selection policy associated with the first UE. In some embodiments of this aspect, the path selection policy indicates a preference between a Uu interface and a PC5 interface. In some embodiments of this aspect, the path selection policy is received by the first UE from a policy control function, PCF, node.

In some embodiments of this aspect, the message comprises a direct communication request message and the method further comprising at least one of: as a result of sending the direct communication request message including the Uu-status parameter, receiving, from a second UE, a direction communication accept message including at least one of the requested Uu status information; and/or as a result of receiving from the second UE the direction communication accept message including the at least one of the requested Uu status information, using at least one of the at least one Uu status information to select one of the PC5 and a Uu path to communicate with the second UE.

In some embodiments of this aspect, the method further includes when the PC5 is selected, continuing a layer-2 link establishment procedure. In some embodiments of this aspect, the method further includes when the first UE does not receive the direct communication accept message from the second UE, attempting to communicate with the second UE through a Uu path via a proximity-based service, ProSe, application server. In some embodiments of this aspect, the ProSe application server is a vehicle-to-everything, V2X, application server. In some embodiments of this aspect, using the at least one of the at least one Uu status information to select the one of the PC5 and the Uu path further comprises using at least one of a path selection algorithm and a UE policy to select the one of the PC5 and the Uu path.

According to another aspect of the present disclosure, a method implemented in a first user equipment, UE, is provided. The method includes receiving a message over PC5, the message including a Uu-status parameter, the Uu-status parameter indicating a request for Uu status information.

In some embodiments of this aspect, the message is a direct communication request message; and receiving the message comprises receiving the direct communication request message comprising the Uu-status parameter from a second UE to initiate a layer-2 link establishment procedure. In some embodiments of this aspect, the Uu-status parameter indicates a request for one or more of: whether a first UE has an established a protocol data unit, PDU, session with a radio access network, RAN; whether the first UE is able to communicate with a proximity-based service, ProSe, application server; communication latency information through the first UE's Uu interface; a path selection policy associated with the first UE; Uu path availability information from the first UE; and the first UE's communication capabilities associated with the Uu interface.

In some embodiments of this aspect, the ProSe application server is a vehicle-to-everything, V2X, application server. In some embodiments of this aspect, the message further includes an indication of a path selection policy associated with a second UE, the message being from the second UE. In some embodiments of this aspect, the path selection policy indicates a preference between a Uu interface and a PC5 interface. In some embodiments of this aspect, the path selection policy is from a policy control function, PCF, node.

In some embodiments of this aspect, the message comprises a direct communication request message and the method further comprising at least one of: as a result of receiving the direct communication request message including the Uu-status parameter, sending, to a second UE, a direction communication accept message including at least one of the requested Uu status information; and/or as a result of receiving the direct communication request message including the Uu-status parameter, negotiating with a second UE to select one of the PC5 and a Uu path to communicate with the second UE.

In some embodiments of this aspect, negotiating with the second UE to select the one of the PC5 and the Uu path further comprises using at least one of a path selection algorithm and a UE policy to select the one of the PC5 and the Uu path. In some embodiments of this aspect, the method further includes when the PC5 is selected, continuing a layer-2 link establishment procedure. In some embodiments of this aspect, the method further includes when the first UE does not send a direct communication accept message to the second UE in response to the received direction communication request message, receiving an attempt to communicate with the first UE through a Uu path via a proximity-based service, ProSe, application server. In some embodiments of this aspect, the ProSe application server is a vehicle-to-everything, V2X, application server.

According to another aspect of the present disclosure, a system is provided. The system includes computer program instructions executable by at least one processor to implement any of the methods above.

According to yet another aspect of the present disclosure, a first user equipment, UE, is provided. The first UE comprises processing circuitry. The processing circuitry is configured to cause the first UE to send a direct communication request message to initiate a layer-2 link establishment procedure over PC5, the direct communication request message including a Uu-status parameter, the Uu-status parameter indicating a request for Uu status information.

In some embodiments of this aspect, the message is a direct communication request message; and the processing circuitry is further configured to cause the first UE to send the direct communication request message comprising the Uu-status parameter to initiate a layer-2 link establishment procedure. In some embodiments of this aspect, the Uu-status parameter indicates a request for one or more of: whether a second UE has an established a protocol data unit, PDU, session with a radio access network, RAN; whether the second UE is able to communicate with a proximity-based service, ProSe, application server; communication latency information through the second UE's Uu interface; a path selection policy associated with the second UE; Uu path availability information from the second UE; and the second UE's communication capabilities associated with the Uu interface.

In some embodiments of this aspect, the ProSe application server is a vehicle-to-everything, V2X, application server. In some embodiments of this aspect, the message further includes in indication of a path selection policy associated with the first UE. In some embodiments of this aspect, the path selection policy indicates a preference between a Uu interface and a PC5 interface. In some embodiments of this aspect, the path selection policy is received by the first UE from a policy control function, PCF, node.

In some embodiments of this aspect, the message comprises a direct communication request message and the processing circuitry is further configured to cause the first UE to at least one of: as a result of sending the direct communication request message including the Uu-status parameter, receive, from a second UE, a direction communication accept message including at least one of the requested Uu status information; and/or as a result of receiving from the second UE the direction communication accept message including the at least one of the requested Uu status information, use at least one of the at least one Uu status information to select one of the PC5 and a Uu path to communicate with the second UE.

In some embodiments of this aspect, the processing circuitry is further configured to cause the first UE to when the PC5 is selected, continue a layer-2 link establishment procedure. In some embodiments of this aspect, the processing circuitry is further configured to cause the first UE to when the first UE does not receive the direct communication accept message from the second UE, attempt to communicate with the second UE through a Uu path via a proximity-based service, ProSe, application server. In some embodiments of this aspect, the ProSe application server is a vehicle-to-everything, V2X, application server. In some embodiments of this aspect, the processing circuitry is further configured to cause the first UE to use the at least one of the at least one Uu status information to select the one of the PC5 and the Uu path by using at least one of a path selection algorithm and a UE policy to select the one of the PC5 and the Uu path.

According to yet another aspect of the present disclosure, a first user equipment, UE, is provided. The first UE comprises processing circuitry. The processing circuitry is configured to cause the first UE to receive a message over PC5, the message including a Uu-status parameter, the Uu-status parameter indicating a request for Uu status information.

In some embodiments of this aspect, the message is a direct communication request message; and the processing circuitry is further configured to cause the first UE to receive the direct communication request message comprising the Uu-status parameter from a second UE to initiate a layer-2 link establishment procedure. In some embodiments of this aspect, the Uu-status parameter indicates a request for one or more of: whether a first UE has an established a protocol data unit, PDU, session with a radio access network, RAN; whether the first UE is able to communicate with a proximity-based service, ProSe, application server; communication latency information through the first UE's Uu interface; a path selection policy associated with the first UE; Uu path availability information from the first UE; and the first UE's communication capabilities associated with the Uu interface.

In some embodiments of this aspect, the ProSe application server is a vehicle-to-everything, V2X, application server. In some embodiments of this aspect, the message further includes an indication of a path selection policy associated with a second UE, the message being from the second UE. In some embodiments of this aspect, the path selection policy indicates a preference between a Uu interface and a PC5 interface. In some embodiments of this aspect, the path selection policy is from a policy control function, PCF, node.

In some embodiments of this aspect, the message comprises a direct communication request message and the processing circuitry is further configured to cause the first UE to at least one of: as a result of receiving the direct communication request message including the Uu-status parameter, send, to a second UE, a direction communication accept message including at least one of the requested Uu status information; and/or as a result of receiving the direct communication request message including the Uu-status parameter, negotiate with a second UE to select one of the PC5 and a Uu path to communicate with the second UE.

In some embodiments of this aspect, the processing circuitry is further configured to cause the first UE to negotiate with the second UE to select the one of the PC5 and the Uu path by using at least one of a path selection algorithm and a UE policy to select the one of the PC5 and the Uu path. In some embodiments of this aspect, the processing circuitry is further configured to cause the first UE to when the PC5 is selected, continue a layer-2 link establishment procedure. In some embodiments of this aspect, the processing circuitry is further configured to cause the first UE to when the first UE does not send a direct communication accept message to the second UE in response to the received direction communication request message, receive an attempt to communicate with the first UE through a Uu path via a proximity-based service, ProSe, application server. In some embodiments of this aspect, the ProSe application server is a vehicle-to-everything, V2X, application server.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is a flowchart of an example process in an initiating UE according to some embodiments of the present disclosure;

FIG. 7 is a flowchart of an example process in a remote/target UE according to some embodiments of the present disclosure.

DETAILED DESCRIPTION

Figure 1:
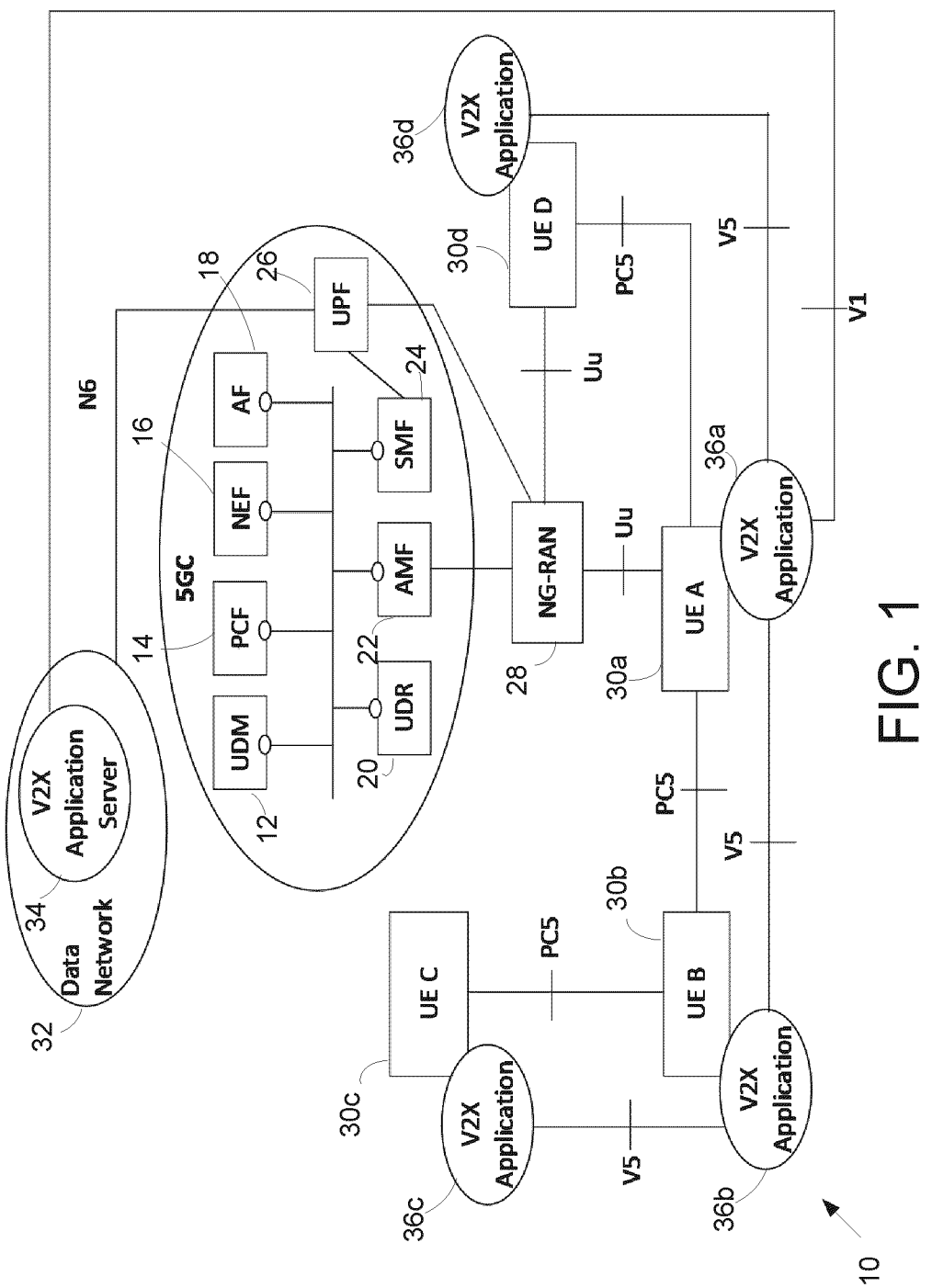
FIG. 1 illustrates an example system architecture.
Figure 2:
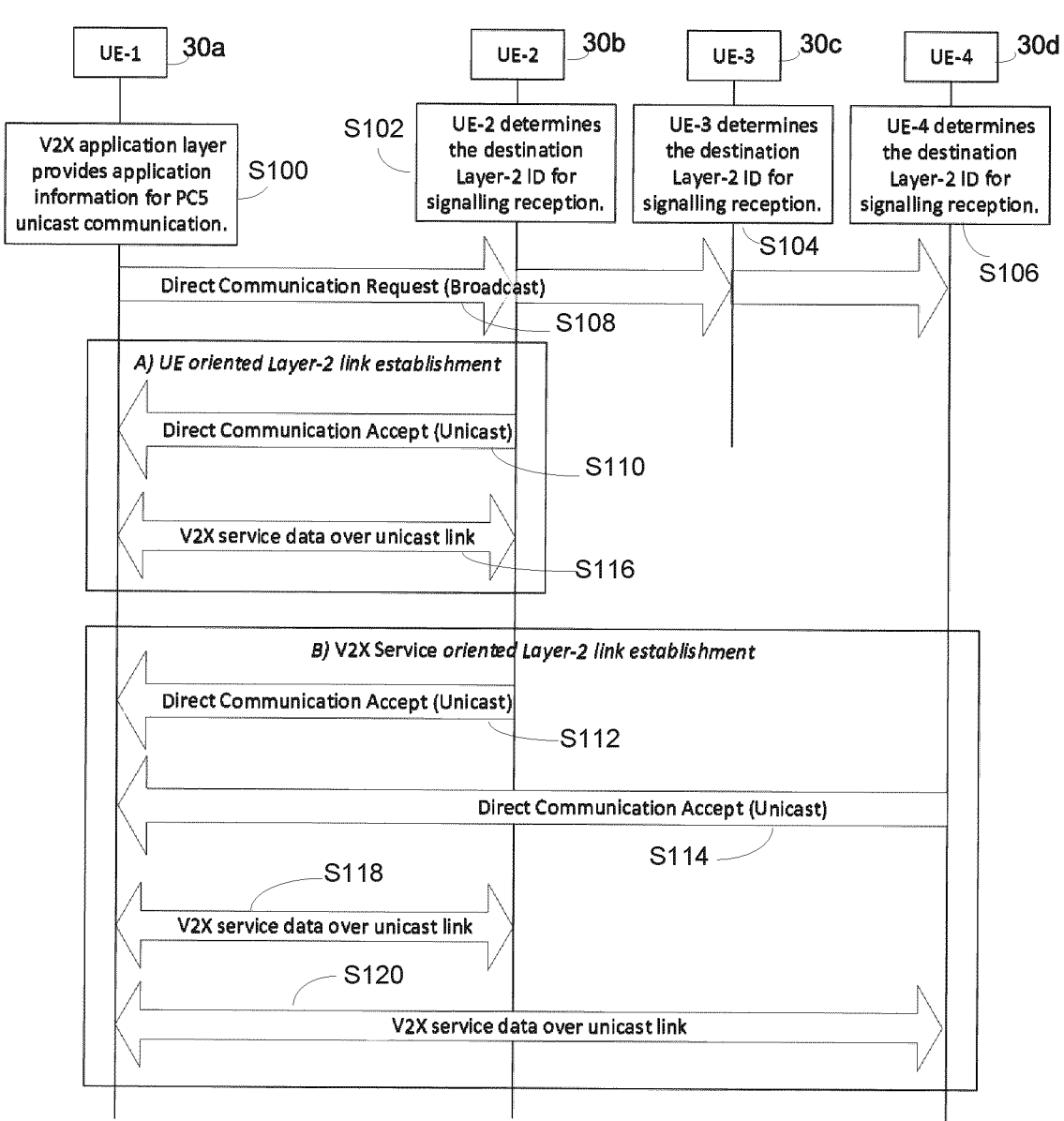
FIG. 2 shows an example of the layer-2 link establishment procedure for unicast mode of V2X communication over PC5 reference point.

In the current specifications, e.g., 3GPP TS 23.303, TS 23.287, there is no solution to support UEs to detect if the other UEs have established a Uu connection with the mobile network (e.g., RAN 28). If two UEs wants to communicate with each other, it may be useful that the UEs know the current status of both Uu interface and PC5 interface, so that the UEs can make a correct path selection between the Uu and PC5 interfaces.

Some embodiments of the present disclosure provide for including a new parameter in the Direct Communication Request message and/or the Direct Communication Accept message to allow the initiating UE and the remote UE to exchange status of their Uu interfaces. Thus, the two UEs can make a path selection between the Uu and PC5 interface.

Some embodiments of the present disclosure may provide one or more advantages:

Following the current standards by reusing the link establishment over the PC5 reference point with minimal changes.

Avoids unnecessary signaling if the initiating UE decides to use Uu communication and the remote UE is out of coverage.

Speeds up communication establishment since the initiating UE knows the available communication options immediately after establishing the PC5 communication link with the remote UE.

Before describing in detail exemplary embodiments, it is noted that the embodiments reside primarily in combinations of apparatus components and processing steps related to path selection between Uu and PC5. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the non-limiting terms wireless device (WD) or a user equipment (UE) are used interchangeably. The UE herein can be any type of wireless device capable of communicating with a network node and/or another UE over radio signals. In some embodiments, the UE may be a machine and/or a vehicle (e.g., V2X vehicle having thereon a V2X application). The UE herein can by any type of communication device capable of communicating with another UE, an application server, a network node, a server and/or other node, via a wired connection and/or a wireless connection. The UE may be a radio communication device such as, an initiating UE, a remote UE, a target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the term "node" is used herein and can be any kind of network node, such as, an Access and Mobility Function (AMF) node, a session management node (e.g., session management function (SMF) node), an access function (AF) node, a user plane function (UPF) node, a policy control function (PCF) node, or any network node. In some embodiments, the network node may be, for example, a subscriber database node, a core network node, a Fifth Generation (5G) and/or New Radio (NR) network node, an Evolved Packet System (EPS) node, an Internet Protocol (IP) Multimedia Subsystem (IMS) node, a Network Function (NF) node, a network repository function (NRF) node, a unified data repository (UDR) node, a unified data management (UDM) node, a Network Exposure Function (NEF) node, a home subscriber server (HSS) node, a home location register (HLR) node, etc.

In yet other embodiments, the network node may include any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB), donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) or a radio network node.

A node may include physical components, such as processors, allocated processing elements, or other computing hardware, computer memory, communication interfaces, and other supporting computing hardware. The node may use dedicated physical components, or the node may be allocated use of the physical components of another device, such as a computing device or resources of a datacenter, in which case the node is said to be virtualized. A node may be associated with multiple physical components that may be located either in one location, or may be distributed across multiple locations. These components may be used to implement and/or support any of the path selection techniques and arrangements disclosed herein.

In some embodiments, the terms "path", "interface", "reference point" and "link" may be used interchangeably. In some embodiments, the terms "parameter" and "information" are used interchangeably.

It should be understood that although the new parameter is called "Uu-status" parameter in this disclosure, it may be given any name and the name used herein is for descriptive purposes. Further, although the general term "parameter" may be used in some embodiments, it may be more generally considered information that is included in a message, such as a Direct Communication Request message for a layer-2 link establishment procedure.

It should also be understood that Uu and PC5 interfaces may be given modified names in the future and the techniques disclosed herein are not intended to be limited to the particular names given these interfaces today.

Layer-2 may include radio resource control (RRC), packet data convergence protocol (PDCP), radio link control (RLC) and medium access control (MAC).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, a flag and/or one or more bit patterns representing the information.

Any two or more embodiments described in this disclosure may be combined in any way with each other.

Although the description herein may be explained in the context of V2X communication, it should be understood that the principles may also be applicable and beneficial to other types of communication.

For example, the principles may also be applicable to any proximity-based services.

Note also that some embodiments of the present disclosure may be supported by standard documents disclosed in Third Generation Partnership Project (3GPP) technical specifications. That is, some embodiments of the description can be supported by the above documents. In addition, all the terms disclosed in the present document may be described by the herein mentioned standard documents.

Note that although terminology from one particular wireless system, such as, for example, $3^{rd}$ Generation Partnership Project (3GPP), Long Term Evolution (LTE), $5^{th}$ Generation (5G) and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a UE 30 described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
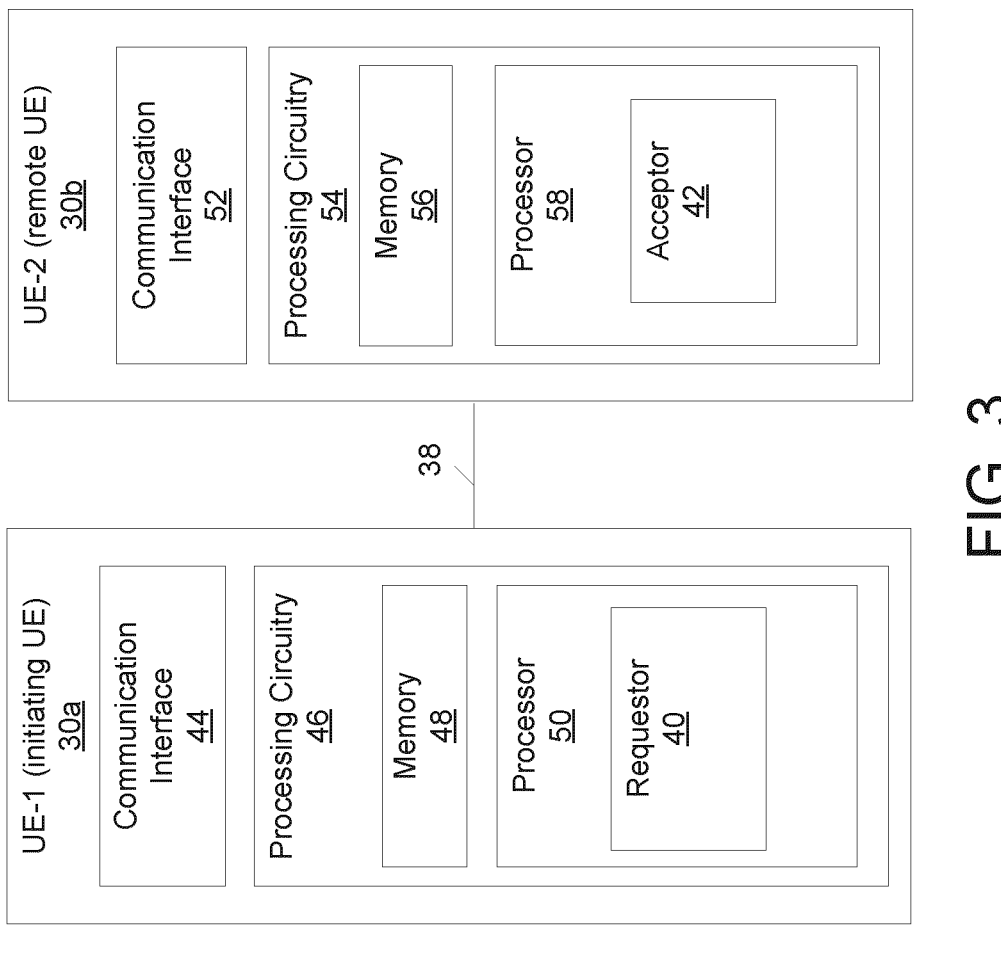
FIG. 3 illustrates another example system architecture according to some embodiments of the present disclosure.

Referring again to the drawing figures in which like reference designators refer to like elements, FIG. 3 illustrates another embodiment of the system 10, which may include an initiating UE 30a and a remote/target UE 30b (UEs 30a, 30b, etc., are collectively referred to herein as UEs 30) that may be configured to operate according to one or more of the techniques disclosed herein. As shown in FIG. 3, these new UEs 30a and 30b, (collectively UEs 30) may replace the known UEs (UE 30) shown in the system 10 of FIG. 1. In some embodiments, there may be one or more interfaces 38 between the UEs 30, such as between UEs 30a and 30b. In some embodiments, the interface 38 may include a PC5 interface. In some embodiments, the interface 38 may include a Uu interface. In some embodiments, the interface 38 may be considered a sidelink or a direct communication link. Although one line is shown for interface 38 for simplicity, it should be understood that the interface 38 may include one or more of any of the reference points/interfaces shown in system 10 in FIG. 1 that may allow for communication between two or more UEs 30 according to the techniques disclosed herein. In addition, the system 10 in FIG. 3 shows only two UEs 30 for brevity, however, the system 10 may include many more devices, nodes and/or connections that those shown in FIG. 3.

Example implementations, in accordance with some embodiments, of an initiating UE 30a and a remote UE 30b, will now be described with reference to FIG. 3.

In some embodiments, UE 30a includes a requestor 40 configured to send a direct communication request message to initiate a layer-2 link establishment procedure, the direct communication request message including a Uu-status parameter, the Uu-status parameter indicating a request for Uu status information.

In some embodiments, UE 30b includes acceptor 42 configured to receive a direct communication request message to initiate a layer-2 link establishment procedure, the direct communication request message including a Uu-status parameter, the Uu-status parameter indicating a request for Uu status information.

Although requestor 40 and acceptor 42 are shown in different UEs it should be understood that a UE may include both the requestor 40 and the acceptor 42.

The initiating UE 30a includes a communication interface 44, processing circuitry 46, and memory 48 in communication with one another either directly or indirectly. The communication interface 44 may be configured to communicate with any of the nodes in the system 10 according to some embodiments of the present disclosure. In some embodiments, the communication interface 44 may be formed as or may include, for example, one or more radio frequency (RF) transmitters, one or more RF receivers, and/or one or more RF transceivers, and/or may be considered a radio interface. In some embodiments, the communication interface 44 may also include a wired interface.

The processing circuitry 46 may include one or more processors 50 and memory, such as, the memory 48. In particular, in addition to a traditional processor and memory, the processing circuitry 46 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 50 may be configured to access (e.g., write to and/or read from) the memory 48, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the initiating UE 30a may further include software stored internally in, for example, memory 48, or stored in external memory (e.g., database) accessible by the initiating UE 30a via an external connection. The software may be executable by the processing circuitry 46. The processing circuitry 46 may be configured to control any of the methods and/or processes described herein and/or to cause such methods, and/or processes to be performed, e.g., by the initiating UE 30a. The memory 48 is configured to store data, programmatic software code and/or other information described herein. In some embodiments, the software may include instructions stored in memory 48 that, when executed by the processor 50 and/or requestor 40 causes the processing circuitry 46 and/or configures the initiating UE 30a to perform the processes described herein with respect to the initiating UE 30a (e.g., processes described with reference to FIGS. 4, 6 and/or any of the other flowcharts).

The remote UE 30*b* includes a communication interface 52, processing circuitry 54, and memory 56. The communication interface 52 may be configured to communicate with the UE 30 and/or other elements in the system 10 according to some embodiments of the present disclosure. In some embodiments, the communication interface 52 may be formed as or may include, for example, one or more radio frequency (RF) transmitters, one or more RF receivers, and/or one or more RF transceivers, and/or may be considered a radio interface. In some embodiments, the communication interface 52 may also include a wired interface.

The processing circuitry 54 may include one or more processors 58 and memory, such as, the memory 56. In particular, in addition to a traditional processor and memory, the processing circuitry 54 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 58 may be configured to access (e.g., write to and/or read from) the memory 56, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the remote UE 30*b* may further include software stored internally in, for example, memory 56, or stored in external memory (e.g., database) accessible by the remote UE 30*b* via an external connection. The software may be executable by the processing circuitry 54. The processing circuitry 54 may be configured to control any of the methods and/or processes described herein and/or to cause such methods, and/or processes to be performed, e.g., by remote UE 30*b*. The memory 56 is configured to store data, programmatic software code and/or other information described herein. In some embodiments, the software may include instructions stored in memory 56 that, when executed by the processor 58 and/or acceptor 42, causes the processing circuitry 54 and/or configures the remote UE 30*b* to perform the processes described herein with respect to the remote UE 30*b* (e.g., processes described with reference to FIGS. 5, 7 and/or any of the other flowcharts).

In FIG. 3, the connection between the devices, initiating UE 30*a*, and remote UE 30*b* is shown without explicit reference to any intermediary devices or connections. However, it should be understood that intermediary devices and/or connections may exist between these devices, although not explicitly shown.

Although FIG. 3 shows requestor 40, and acceptor 42, as being within a respective processor, it is contemplated that these elements may be implemented such that a portion of the elements is stored in a corresponding memory within the processing circuitry. In other words, the elements may be implemented in hardware or in a combination of hardware and software within the processing circuitry.

Figure 4:
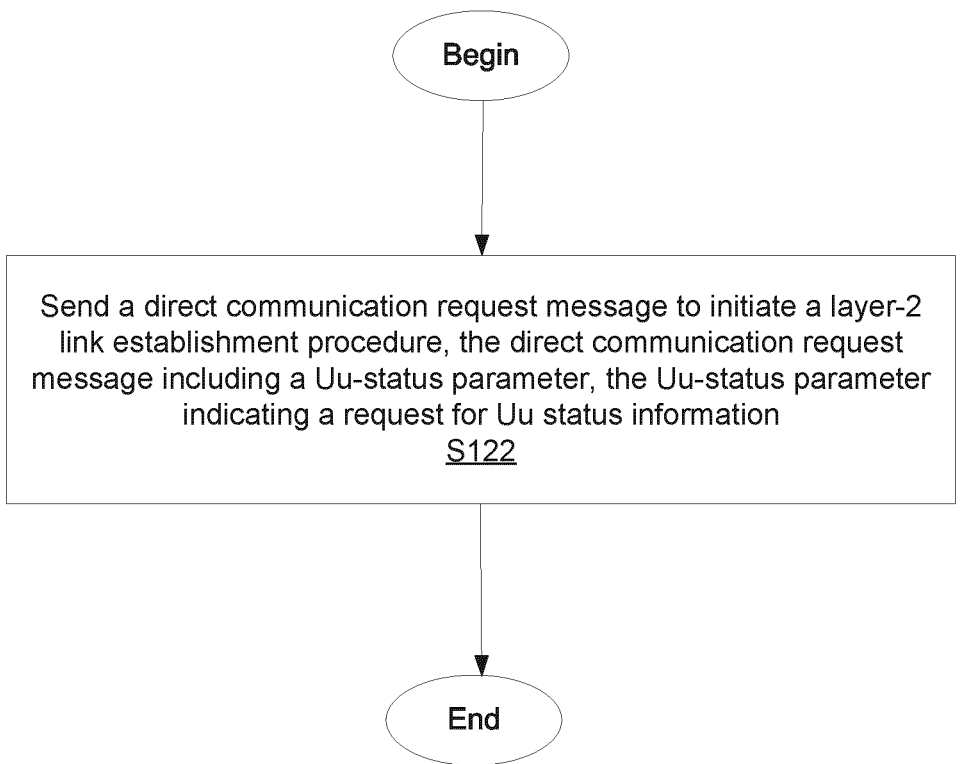
FIG. 4 is a flowchart of an example process in an initiating UE according to some embodiments of the present disclosure.

FIG. 4 is a flowchart of an example process in a UE 30 (e.g., initiating UE 30*a*) according to some embodiments of the present disclosure. One or more Blocks and/or functions and/or methods performed by the UE 30 may be performed by one or more elements of UE 30 such as by requestor 40 in processing circuitry 46, memory 48, processor 50, communication interface 44, etc. according to the example process/method. The example process includes sending (Block S122), such as via requestor 40, processing circuitry 46, memory 48, processor 50, and/or communication interface 44, a direct communication request message to initiate a layer-2 link establishment procedure, the direct communication request message including a Uu-status parameter, the Uu-status parameter indicating a request for Uu status information.

In some embodiments, the Uu-status parameter indicates a request for one or more of: whether a second UE has an established a protocol data unit (PDU) session with a radio access network (RAN); whether the second UE is able to communicate with a V2X application server 34; communication latency information through the second UE's Uu interface; and a path selection policy of the second UE.

In some embodiments, the direct communication request message further includes an indication of a path selection policy of the first UE. In some embodiments, the method further includes as a result of sending the direct communication request message including the Uu-status parameter, receiving, from a second UE, such as via requestor 40, processing circuitry 46, memory 48, processor 50, and/or communication interface 44, a direction communication accept message including one or more of the requested Uu status information.

In some embodiments, the method includes as a result of receiving from the second UE the direction communication accept message including the one or more of the requested Uu status information, using, such as via requestor 40, processing circuitry 46, memory 48, processor 50, and/or communication interface 44, at least one of the one or more Uu status information to select one of a PC5 path and a Uu path to communicate with the second UE. In some embodiments, the method includes if the PC5 path is selected, continuing, such as via requestor 40, processing circuitry 46, memory 48, processor 50, and/or communication interface 44, the layer-2 link establishment procedure. In some embodiments, the method includes if the first UE does not receive the direct communication accept message from the second UE, attempting, such as via requestor 40, processing circuitry 46, memory 48, processor 50, and/or communication interface 44, to communicate with the second UE through the Uu path via a V2X application server 34.

In some embodiments, using the at least one of the one or more Uu status information to select the one of the PC5 path and the Uu path further includes using, such as via requestor 40, processing circuitry 46, memory 48, processor 50, and/or communication interface 44, at least one of a path selection algorithm and a UE policy.

Figure 5:
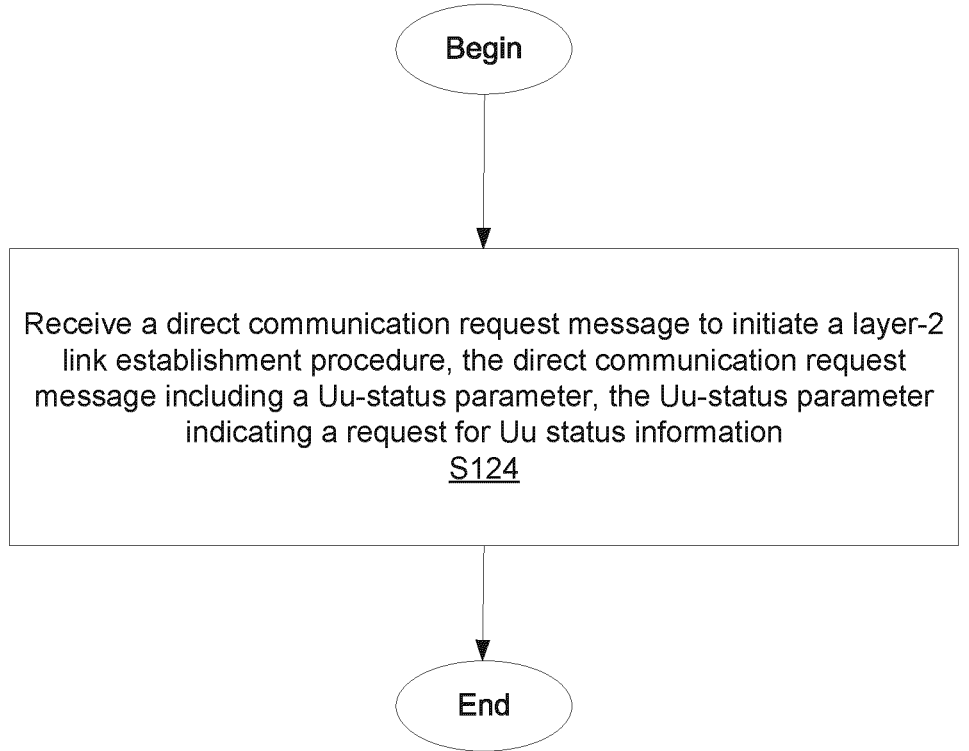
FIG. 5 is a flowchart of an example process in a remote/target UE according to some embodiments of the present disclosure.

FIG. 5 is a flowchart of an example process in a UE 30 (e.g., remote UE 30*b*) according to some embodiments of the present disclosure. One or more Blocks and/or functions and/or methods performed by the UE 30 may be performed by one or more elements of UE 30 such as acceptor 42 in processing circuitry 54, memory 56, processor 58, communication interface 52, etc. according to the example process/method. The example process includes receiving (Block S124), such as via acceptor 42, processing circuitry 54, memory 56, processor 58, communication interface 52, from a second UE, a direct communication request message to initiate a layer-2 link establishment procedure, the direct communication request message including a Uu-status parameter, the Uu-status parameter indicating a request for Uu status information.

In some embodiments, the Uu-status parameter indicates a request for one or more of: whether the first UE has an established a protocol data unit (PDU) session with a radio access network (RAN); whether the first UE is able to communicate with a V2X application server 34; communication latency information through the first UE's Uu interface; and a path selection policy of the first UE.

In some embodiments, the direct communication request message further includes an indication of a path selection policy of the second UE. In some embodiments, the method further includes as a result of receiving the direct communication request message including the Uu-status parameter, sending, to the second UE, such as via acceptor 42, processing circuitry 54, memory 56, processor 58, communication interface 52, a direction communication accept message including one or more of the requested Uu status information. In some embodiments, the method includes, as a result of receiving the direct communication request message including the Uu-status parameter, negotiating, such as via acceptor 42, processing circuitry 54, memory 56, processor 58, communication interface 52, with the second UE to select one of a PC5 path and a Uu path to communicate with the second UE.

In some embodiments, negotiating with the second UE to select the one of the PC5 path and the Uu path further includes using, such as via acceptor 42, processing circuitry 54, memory 56, processor 58, communication interface 52, at least one of a path selection algorithm and a UE policy.

FIG. 6 is a flowchart of an example process in a UE 30 (e.g., initiating UE 30*a*) according to some embodiments of the present disclosure. One or more Blocks and/or functions and/or methods performed by the UE 30 may be performed by one or more elements of UE 30 such as by requestor 40 in processing circuitry 46, memory 48, processor 50, communication interface 44, etc. according to the example process/method. The example process includes sending (S126), such as by requestor 40, processing circuitry 46, memory 48, processor 50 and/or communication interface 44, a message over PC5, the message including a Uu-status parameter, the Uu-status parameter indicating a request for Uu status information.

In some embodiments, the message is a direct communication request message; and sending the message comprises sending the direct communication request message comprising the Uu-status parameter to initiate a layer-2 link establishment procedure. In some embodiments, the Uu-status parameter indicates a request for one or more of: whether a second UE has an established a protocol data unit, PDU, session with a radio access network, RAN; whether the second UE is able to communicate with a proximity-based service, ProSe, application server; communication latency information through the second UE's Uu interface; a path selection policy associated with the second UE; Uu path availability information from the second UE; and the second UE's communication capabilities associated with the Uu interface.

In some embodiments, the ProSe application server is a vehicle-to-everything, V2X, application server. In some embodiments, the message further includes in indication of a path selection policy associated with the first UE. In some embodiments, the path selection policy indicates a preference between a Uu interface and a PC5 interface. In some embodiments, the path selection policy is received by the first UE from a policy control function, PCF, node 14.

In some embodiments, the message comprises a direct communication request message and the method further comprising at least one of: as a result of sending the direct communication request message including the Uu-status parameter, receiving, from a second UE, a direction communication accept message including at least one of the requested Uu status information; and/or as a result of receiving from the second UE the direction communication accept message including the at least one of the requested Uu status information, using at least one of the at least one Uu status information to select one of the PC5 and a Uu path to communicate with the second UE.

In some embodiments, the method further includes when the PC5 is selected, continuing, such as by requestor 40, processing circuitry 46, memory 48, processor 50 and/or communication interface 44, a layer-2 link establishment procedure. In some embodiments, the method further includes when the first UE does not receive the direct communication accept message from the second UE, attempting, such as by requestor 40, processing circuitry 46, memory 48, processor 50 and/or communication interface 44, to communicate with the second UE through a Uu path via a proximity-based service, ProSe, application server. In some embodiments, the ProSe application server is a vehicle-to-everything, V2X, application server. In some embodiments, using the at least one of the at least one Uu status information to select the one of the PC5 and the Uu path further comprises using, such as by requestor 40, processing circuitry 46, memory 48, processor 50 and/or communication interface 44, at least one of a path selection algorithm and a UE policy to select the one of the PC5 and the Uu path.

FIG. 7 is a flowchart of an example process in a UE 30 (e.g., remote UE 30*b*) according to some embodiments of the present disclosure. One or more Blocks and/or functions and/or methods performed by the UE 30 may be performed by one or more elements of UE 30 such as acceptor 42 in processing circuitry 54, memory 56, processor 58, communication interface 52, etc. according to the example process/method. The example process includes receiving (S128), such as by acceptor 42, processing circuitry 54, memory 56, processor 58 and/or communication interface 52, a message over PC5, the message including a Uu-status parameter, the Uu-status parameter indicating a request for Uu status information.

In some embodiments, the message is a direct communication request message; and receiving the message comprises receiving, such as by acceptor 42, processing circuitry 54, memory 56, processor 58 and/or communication interface 52, the direct communication request message comprising the Uu-status parameter from a second UE to initiate a layer-2 link establishment procedure. In some embodiments, the Uu-status parameter indicates a request for one or more of: whether a first UE has an established a protocol data unit, PDU, session with a radio access network, RAN; whether the first UE is able to communicate with a proximity-based service, ProSe, application server; communication latency information through the first UE's Uu interface; a path selection policy associated with the first UE; Uu path availability information from the first UE; and the first UE's communication capabilities associated with the Uu interface.

In some embodiments, the ProSe application server is a vehicle-to-everything, V2X, application server. In some embodiments, the message further includes an indication of a path selection policy associated with a second UE, the message being from the second UE. In some embodiments, the path selection policy indicates a preference between a Uu interface and a PC5 interface. In some embodiments, the path selection policy is from a policy control function, PCF, node 14. In some embodiments, the message comprises a direct communication request message and the method further comprising at least one of: as a result of receiving the direct communication request message including the Uu-status parameter, sending, such as by acceptor 42, processing circuitry 54, memory 56, processor 58 and/or communication interface 52, to a second UE, a direction communication accept message including at least one of the requested Uu status information; and/or as a result of receiving the direct communication request message including the Uu-status parameter, negotiating, such as by acceptor 42, processing circuitry 54, memory 56, processor 58 and/or communication interface 52, with a second UE to select one of the PC5 and a Uu path to communicate with the second UE.

In some embodiments, negotiating with the second UE to select the one of the PC5 and the Uu path further comprises using, such as by acceptor 42, processing circuitry 54, memory 56, processor 58 and/or communication interface 52, at least one of a path selection algorithm and a UE policy to select the one of the PC5 and the Uu path. In some embodiments, the method further includes when the PC5 is selected, continuing a layer-2 link establishment procedure. In some embodiments, the method further includes when the first UE does not send a direct communication accept message to the second UE in response to the received direction communication request message, receiving, such as by acceptor 42, processing circuitry 54, memory 56, processor 58 and/or communication interface 52, an attempt to communicate with the first UE through a Uu path via a proximity-based service, ProSe, application server. In some embodiments, the ProSe application server is a vehicle-to-everything, V2X, application server.

Figure 8:
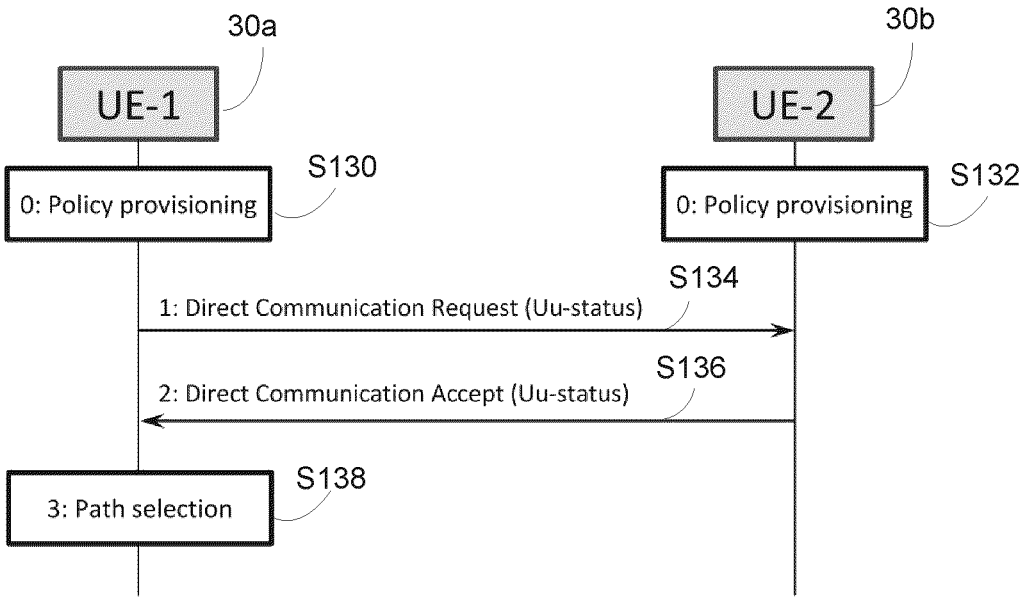
FIG. 8 is a call flow diagram illustrating an example process for exchanging Uu status information according to some embodiments of the present disclosure.

Having generally described arrangements for path selection between Uu and PC5 and/or exchange and/or transmission of Uu status e.g., as part of PC5 link establishment procedure, a more detailed description of some of the embodiments are provided as follows with reference to FIG. 8, and which may be implemented by one or more UEs 30 and/or nodes discussed herein.

Unicast Link Establishment to a Remote UE

For the initiating UE (e.g., UE-1 30*a*) to perform path selection, in some embodiments the UE becomes aware of the one or more remote/target UEs (e.g., UE-2 30*b*) communication capabilities, e.g., if UE-2 30*b* can communicate via the Uu interface as well as the PC5 interface. In some embodiments, to avoid unnecessary signaling this information (e.g., remote UEs communication capabilities) can be requested from the remote UE 22*b* when, for example, the PC5 link is being established by adding a parameter in the Direct Communication Request and Direct Communication Accept messages.

In one embodiment, such communication capabilities may include a signal strength, etc.

One example embodiment is described with reference to the steps in the call flow depicted in FIG. 8, as follows:

0. S130 and S132: Authorization and policy provisioning for communications over the PC5 reference point may be performed by an initiating UE (e.g., UE-1 30*a*) according to section 5.1.2.1 in TS 23.287. Policies of e.g., preference between a Uu and PC5 path/interface may also be provisioned in this step by e.g., the initiating UE.

1. S134: UE-1 30*a* sends a Direct Communication Request message to a remote UE (e.g., UE-2 30*b*) to initiate the unicast layer-2 link establishment procedure. The direct Communication Request message may further include several other parameters, for example, defined in TS 23.287.

In some embodiments, the policies of e.g., preference between a Uu and PC5 path/interface may be received by a UE (e.g., UE-1 30*a*) from a PCF node 14.

Additionally, a new Uu-status parameter is included in the Direct Communication Request message, requesting UE-2

30*b* to inform UE-1 30*a* about UE-2's Uu status, e.g., whether UE-2 30*b* has an established a protocol data unit (PDU) session with the mobile network (e.g., RAN 28) and can contact the application server 34, communication latencies through Uu, etc.

Optionally, in some embodiments, the initiating UE (e.g., UE-1 30*a*) can also include path selection policies into the Direct Communication Request message, so that the two UEs 30*a* and 30*b* can exchange the policy and conduct negotiation (e.g., over which path, Uu or PC5, to use).

2. S136: Remote UE (e.g., UE-2 30*b*) responds with a Direct Communication Accept message including a set of parameters, for example, as defined in TS 23.287.

Additionally, UE-2 30*b* may include the Uu-status information in the Direct Communication Accept message to indicate the status of its Uu connection, e.g., indicating that there exists a PDU session and UU-2 30*b* can contact the application server 34, communication latencies through Uu, etc.

3. S138: In some embodiments, after receiving the response from UE-2 30*b*, UE-1 30*a* may determine which path to use based on the received information. In some embodiments, UE-1 30*a* may perform a path selection algorithm based on the received information from UE-2 30*b* and further based on its own policy in step S138.

If UE-1 30*a* chooses the PC5 path (either due to policy or unavailability of Uu interfaces), then ue-1 30*a* may continue the unicast establishment procedure, for example, as defined in TS 23.287.

In some embodiments, if the UE-1 30*a* chooses the Uu path (due to policy and/or Uu path availability indication from UE-2 30*b*), the UEs may use the Uu path.

Note that, if UE-1 30*a* and UE-2 30*b* is out of communication range or UE-2 30*b* does not want to establish a PC5 unicast link, then UE-1 30*a* may not receive the response (Direct Communication Accept message) from UE-302*b* successfully; in which case UE-1 30*a* may not perform the path selection. Instead, the UE-1 30*a* may attempt to reach UE-2 30*b* through the Uu interface via the application server 34.

For example, the application server may be a ProSe application server, such as a V2X application server.

EMBODIMENTS

Embodiment A1. A method implemented in a first user equipment (UE), the method comprising:

sending a direct communication request message to initiate a layer-2 link establishment procedure, the direct communication request message including a Uu-status parameter, the Uu-status parameter indicating a request for Uu status information.

Embodiment A2. The method of Embodiment A1, wherein the Uu-status parameter indicates a request for one or more of:

whether a second UE has an established a protocol data unit (PDU) session with a radio access network (RAN);

whether the second UE is able to communicate with a V2X application server;

communication latency information through the second UE's Uu interface; and a path selection policy of the second UE.

Embodiment A3. The method of any one of Embodiments A1 and A2, wherein the direct communication request message further includes an indication of a path selection policy of the first UE.

Embodiment A4. The method of any one of Embodiments A1-A3, further comprising one or more of:

as a result of sending the direct communication request message including the Uu-status parameter, receiving, from a second UE, a direction communication accept message including one or more of the requested Uu status information;

as a result of receiving from the second UE the direction communication accept message including the one or more of the requested Uu status information, using at least one of the one or more Uu status information to select one of a PC5 path and a Uu path to communicate with the second UE;

if the PC5 path is selected, continuing the layer-2 link establishment procedure; and/or if the first UE does not receive the direct communication accept message from the second UE, attempting to communicate with the second UE through the Uu path via a V2X application server.

Embodiment A5. The method of any one of Embodiments A1-A4, wherein using the at least one of the one or more Uu status information to select the one of the PC5 path and the Uu path further comprises using at least one of a path selection algorithm and a UE policy.

Embodiment B1. A first user equipment (UE), the first UE comprising processing circuitry, the processing circuitry configured to cause the first UE to:

send a direct communication request message to initiate a layer-2 link establishment procedure, the direct communication request message including a Uu-status parameter, the Uu-status parameter indicating a request for Uu status information.

Embodiment B2. The first UE of Embodiment B1, wherein the Uu-status parameter indicates a request for one or more of:

whether a second UE has an established a protocol data unit (PDU) session with a radio access network (RAN);

whether the second UE is able to communicate with a V2X application server;

communication latency information through the second UE's Uu interface; and a path selection policy of the second UE.

Embodiment B3. The first UE of any one of Embodiments B1 and B2, wherein the direct communication request message further includes an indication of a path selection policy of the first UE.

Embodiment B4. The first UE of any one of Embodiments B1-B3, wherein the processing circuitry is configured to cause the first UE to one or more of:

as a result of sending the direct communication request message including the Uu-status parameter, receive, from a second UE, a direction communication accept message including one or more of the requested Uu status information;

as a result of receiving from the second UE the direction communication accept message including the one or more of the requested Uu status information, use at least one of the one or more Uu status information to select one of a PC5 path and a Uu path to communicate with the second UE;

if the PC5 path is selected, continue the layer-2 link establishment procedure; and/or if the first UE does not receive the direct communication accept message from the second UE, attempt to communicate with the second UE through the Uu path via a V2X application server.

Embodiment B5. The first UE of any one of Embodiments B1-B4, wherein the processing circuitry is further configured to use the at least one of the one or more Uu status information to select the one of the PC5 path and the Uu path by being configured to use at least one of a path selection algorithm and a UE policy.

Embodiment C1. A method implemented in a first user equipment (UE), the method comprising:

receiving, from a second UE, a direct communication request message to initiate a layer-2 link establishment procedure, the direct communication request message including a Uu-status parameter, the Uu-status parameter indicating a request for Uu status information.

Embodiment C2. The method of Embodiment C1, wherein the Uu-status parameter indicates a request for one or more of:

whether the first UE has an established a protocol data unit (PDU) session with a radio access network (RAN);

whether the first UE is able to communicate with a V2X application server;

communication latency information through the first UE's Uu interface; and a path selection policy of the first UE.

Embodiment C3. The method of any one of Embodiments C1 and C2, wherein the direct communication request message further includes an indication of a path selection policy of the second UE.

Embodiment C4. The method of any one of Embodiments C1-C3, further comprising one or more of:

as a result of receiving the direct communication request message including the Uu-status parameter, sending, to the second UE, a direction communication accept message including one or more of the requested Uu status information; and as a result of receiving the direct communication request message including the Uu-status parameter, negotiating with the second UE to select one of a PC5 path and a Uu path to communicate with the second UE.

Embodiment C5. The method of any one of Embodiments C1-C4, wherein negotiating with the second UE to select the one of the PC5 path and the Uu path further comprises using at least one of a path selection algorithm and a UE policy.

Embodiment D1. A first user equipment (UE), the first UE comprising processing circuitry, the processing circuitry configured to cause the first UE to:

receive, from a second UE, a direct communication request message to initiate a layer-2 link establishment procedure, the direct communication request message including a Uu-status parameter, the Uu-status parameter indicating a request for Uu status information.

Embodiment D2. The first UE of Embodiment D1, wherein the Uu-status parameter indicates a request for one or more of:

whether the first UE has an established a protocol data unit (PDU) session with a radio access network (RAN);

whether the first UE is able to communicate with a V2X application server;

communication latency information through the first UE's Uu interface; and a path selection policy of the first UE.

Embodiment D3. The first UE of any one of Embodiments D1 and D2, wherein the direct communication request message further includes an indication of a path selection policy of the second UE.

Embodiment D4. The first UE of any one of Embodiments D1-D3, wherein the processing circuitry is configured to cause the first UE to one or more of:

as a result of receiving the direct communication request message including the Uu-status parameter, send, to the second UE, a direction communication accept message including one or more of the requested Uu status information; and as a result of receiving the direct communication request message including the Uu-status parameter, negotiate with the second UE to select one of a PC5 path and a Uu path to communicate with the second UE.

Embodiment D5. The first UE of any one of Embodiments D1-D4, wherein the processing circuitry is further configured to negotiate with the second UE to select the one of the PC5 path and the Uu path by being configured to use at least one of a path selection algorithm and a UE policy.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a first user equipment, UE, the method comprising:

sending, over PC5, a direct communication request message, to initiate a link establishment procedure, the direct communication request message comprising: a Uu-status parameter, the Uu-status parameter requesting Uu status information that indicates whether a second UE has an established protocol data unit (PDU) session with a mobile network, the Uu-status parameter indicating a request for communication latency information through the second UE's Uu interface;

receiving, from the second UE, the requested Uu status information; and using a path selection algorithm to select between a PC5 path and a Uu path to communicate with the second UE, the selection being based on the requested Uu status information.

2. The method of claim 1, wherein:

sending the direct communication request message comprising the Uu-status parameter to initiate a layer-2 link establishment procedure.

3. The method of claim 1, wherein the Uu-status parameter indicates a request for one or more of:

whether the second UE is able to communicate with a proximity-based service, ProSe, application server;

a path selection policy associated with the second UE;

Uu path availability information from the second UE; and the second UE's communication capabilities associated with the Uu interface.

4. The method of claim 1, wherein the direct communication request message further includes an indication of a path selection policy associated with the first UE.

5. The method of claim 1, further comprising one or more of:

as a result of sending the direct communication request message including the Uu-status parameter, receiving, from the second UE, a direction communication accept message including at least one of the requested Uu status information; and as a result of receiving from the second UE the direction communication accept message including the at least one of the requested Uu status information, using at least one of the at least one requested Uu status information to select one of the PC5 and a Uu path to communicate with the second UE.

6. The method of claim 5, further comprising:

when the first UE does not receive the direct communication accept message from the second UE, attempting to communicate with the second UE through the Uu path via a proximity-based service, ProSe, application server.

7. A method implemented in a first user equipment, UE, the method comprising:

receiving, over PC5, from a second UE, a direct communication request message to initiate a link establishment procedure, the direct communication request message including a Uu-status parameter, the Uu-status parameter requesting Uu status information that indicates whether the first UE has an established protocol data unit (PDU) session with a mobile network, the Uu-status parameter indicating a request for communication latency information through the first UE's Uu interface; and sending, to the second UE, the requested Uu status information for selection, using a path selection algorithm and the Uu status information, between a PC5 path and a Uu path for communication with the first UE.

8. The method of claim 7, wherein:

receiving the direct communication request message comprising the Uu-status parameter from the second UE is to initiate a layer-2 link establishment procedure.

9. The method of claim 7, wherein the Uu-status parameter indicates a request for one or more of:

whether the first UE is able to communicate with a proximity-based service, ProSe, application server;

a path selection policy associated with the first UE;

Uu path availability information from the first UE; and the first UE's communication capabilities associated with the Uu interface.

10. The method of claim 8, wherein the direct communication request message further includes an indication of a path selection policy associated with the second UE, the direct communication request message being from the second UE.

11. The method of claim 9, further comprising one or more of:

as a result of receiving the direct communication request message including the Uu-status parameter, sending, to the second UE, a direction communication accept message including at least one of the requested Uu status information; and as a result of receiving the direct communication request message including the Uu-status parameter, negotiating with the second UE to select one of the PC5 and a Uu path to communicate with the second UE.

12. The method of claim 11, further comprising:

when the first UE does not send the direct communication accept message to the second UE in response to the received direction communication request message, receiving an attempt to communicate with the first UE through the Uu path via a proximity-based service, ProSe, application server.

13. A first user equipment, UE, comprising processing circuitry, the processing circuitry configured to cause the first UE to:

send, over PC5, a direct communication request message to initiate a layer-2 link establishment procedure, the direct communication request message including a Uu-status parameter, the Uu-status parameter requesting Uu status information that indicates whether a second UE has an established protocol data unit (PDU) session with a mobile network, the Uu-status parameter indicating a request for communication latency information through the second UE's Uu interface;

receive, from the second UE, the requested Uu status information; and use a path selection algorithm to select between a PC5 path and a Uu path to communicate with the second UE, the selection being based on the requested Uu status information.

14. The first UE of claim 13, wherein:

the processing circuitry is further configured to cause the first UE to send the direct communication request message comprising the Uu-status parameter to initiate a layer-2 link establishment procedure.

15. The first UE of claim 13, wherein the Uu-status parameter indicates a request for one or more of:

whether the second UE is able to communicate with a proximity-based service, ProSe, application server;

a path selection policy associated with the second UE;

Uu path availability information from the second UE; and the second UE's communication capabilities associated with the Uu interface.

16. The first UE of claim 13 wherein the direct communication request message further includes an indication of a path selection policy associated with the first UE.

17. The first UE of claim 13, wherein the processing circuitry is further configured to cause the first UE to one or more of:

as a result of sending the direct communication request message including the Uu-status parameter, receive, from the second UE, a direction communication accept message including at least one of the requested Uu status information; and as a result of receiving from the second UE the direction communication accept message including the at least one of the requested Uu status information, use at least one of the at least one requested Uu status information to select one of the PC5 and a Uu path to communicate with the second UE.

18. A first user equipment, UE, comprising processing circuitry, the processing circuitry configured to cause the first UE to:

receive over PC5, from a second UE, a direct communication request message to initiate a link establishment procedure, the direct communication request message including a Uu-status parameter, the Uu-status parameter requesting Uu status information that indicates whether the first UE has an established protocol data unit (PDU) session with a mobile network, the Uu-status parameter indicating a request for communication latency information through the first UE's Uu interface; and send, to the second UE, the requested Uu status information for selection, using a path selection algorithm and the requested Uu status information, between a PC5 path and a Uu path to communicate with the first UE.

19. The first UE of claim 18, wherein:

the processing circuitry is further configured to cause the first UE to receive the direct communication request message comprising the Uu-status parameter from the second UE to initiate a layer-2 link establishment procedure.

20. The first UE of claim 18, wherein the Uu-status parameter indicates a request for one or more of:

whether the first UE is able to communicate with a proximity-based service, ProSe, application server;

a path selection policy associated with the first UE;

Uu path availability information from the first UE; and the first UE's communication capabilities associated with the Uu interface.

21. The first UE of claim 18, wherein the direct communication request message further includes an indication of a path selection policy associated with the second UE, the direct communication request message being from the second UE.

22. The first UE of claim 19, wherein the processing circuitry is further configured to cause the first UE to one or more of:

as a result of receiving the direct communication request message including the Uu-status parameter, send, to the second UE, a direction communication accept message including at least one of the requested Uu status information; and as a result of receiving the direct communication request message including the Uu-status parameter, negotiate with the second UE to select one of the PC5 and a Uu path to communicate with the second UE.

\* \* \* \* \*